US007563300B2

(12) United States Patent
Nishiyama et al.

(10) Patent No.: US 7,563,300 B2
(45) Date of Patent: Jul. 21, 2009

(54) AIR CLEANER

(75) Inventors: Toshihiko Nishiyama, Oyama (JP);
Shigeo Matsushima, Oyama (JP)

(73) Assignee: Komatsu Ltd., Tokyo (JP)

( * ) Notice: Subject to any disclaimer, the term of this patent is extended or adjusted under 35 U.S.C. 154(b) by 560 days.

(21) Appl. No.: 11/157,502

(22) Filed: Jun. 21, 2005

(65) Prior Publication Data
US 2005/0284118 A1 Dec. 29, 2005

(30) Foreign Application Priority Data
Jun. 23, 2004 (JP) ............................. 2004-184503
Jun. 3, 2005 (JP) ............................. 2005-164557

(51) Int. Cl.
*B01D 46/00* (2006.01)
(52) U.S. Cl. .............................. 55/498; 55/482; 55/502
(58) Field of Classification Search .................. 55/498, 55/497, 502, 521, 482; 95/273, 286; 210/493.1, 210/493.5
See application file for complete search history.

(56) References Cited

U.S. PATENT DOCUMENTS

| 5,066,432 | A | * | 11/1991 | Gabathuler et al. | ............ 264/28 |
| 5,171,342 | A | * | 12/1992 | Trefz | ............ 55/487 |
| 5,795,369 | A | * | 8/1998 | Taub | ............ 95/273 |
| 5,820,646 | A | * | 10/1998 | Gillingham et al. | ............ 55/488 |
| 6,221,122 | B1 | * | 4/2001 | Gieseke et al. | ................ 55/500 |
| 6,511,599 | B2 | * | 1/2003 | Jaroszczyk et al. | ........ 210/493.5 |
| 2002/0170856 | A1 | | 11/2002 | Jaroszczyk et al. | |

FOREIGN PATENT DOCUMENTS

| CN | 2239285 Y | 11/1996 |
| CN | 2239285 Y | * 11/1996 |
| CN | 95215193 | * 11/1996 |
| JP | 59-133762 U | 9/1984 |
| JP | 2000-508974 A | 7/2000 |

OTHER PUBLICATIONS

A Chinese Office Action (and English translation thereof) dated Mar. 7, 2008, issued in a counterpart Chinese Application.

* cited by examiner

*Primary Examiner*—Duane Smith
*Assistant Examiner*—Ives Wu
(74) *Attorney, Agent, or Firm*—Frishauf, Holtz, Goodman & Chick, P.C.

(57) ABSTRACT

The present invention provides an air cleaner, in which a casing has an air inlet pipe making air inflow along a direction perpendicular to the axis of a cylindrical filter element, and an air outlet pipe making filtered air outflow along the axis, and the casing has a supporter clingingly supporting the end outer circumference of the filter element on closed valley portions side along the circumference direction continuously, and another supporter supporting the end inner circumference of the filter element on closed mountain portions side along the circumference direction continuously to close a hollow portion, and air to be filtered inflows to the filter element from a first inflow space on the top side of the mountain portions as well as from the end of a second inflow space side, and filtered air outflows from the end on an outflow space side as well as from the hollow portion.

13 Claims, 16 Drawing Sheets

AIR CLEANER

BACKGROUND OF THE INVENTION

1. Field of the Invention

The present invention relates to an air cleaner, and more particularly, to an air cleaner for an engine of a vehicle that is used at dusty places.

2. Description of Related Art

Concerning the configuration of an air cleaner and a filter element used therein, there have been conventionally known, for example, a double-elements type air cleaner as disclosed in Japanese Unexamined Utility Model Application No. S59-133762, on pages 6 to 7, FIG. 2, FIG. 3 and others (hereinafter referred to as document 1), and a serial type air cleaner as disclosed in Japanese Unexamined Patent Application No. 2000-508974, on page 12, FIG. 1 and others (hereinafter referred to as document 2).

FIG. 14 shows a cross-sectional view of a double-cylinder type air cleaner 70 disclosed in the document 1. As shown in FIG. 14, a cylinder-shaped casing 71 has an inlet pipe 72 formed on the side thereof, and an outlet pipe 73 formed on the center of a closer plate, and a bridge 74 having a couple of leg portions whose ends are welded to the inner side of the outlet pipe 73 extends toward the opened end of the casing 71 with its top portion fixed to a stud bolt 75. At the opened end of the casing 71, there is detachably mounted a dust pan 76. Inside the casing 71, there are arranged a first filter element 80 located adjacent to the casing inner wall and a second filter element 81 located inside the first filter element 80, configuring double-cylinder type.

FIG. 15 shows a perspective view of the first filter element 80. As shown in FIG. 15, the first filter element 80 has a filter 83 that is made of a filter paper or non-woven fabric and is pleated to be formed into a cylinder arranged around an inner cylinder 82 having multiple holes, and an outer cylinder 84 having multiple holes arranged around the filter 83. The first filter element 80 has arranged on the top and bottom thereof an annular end plate 85 provided with an opening at the center thereof, and a closing end plate 86 provided with an opening at the center thereof through which the stud bolt 75 passes, which are fixed using adhesion bond.

The second filter element 81 and the first filter element 80 are inserted into the casing 71 in this order from the dust pan 76 side, and their respective closing end plates 86, 87 are fixed to the stud bolt 75 using screws.

Ambient air taken in from the inlet pipe 72 comes in from the outer circumference side of the first filter element 80, and filtered air is sent to the inner circumference side of the first filter element 80 to pass through the second filter element 81 to be supplied to an engine from the outlet pipe 73. The first filter element 80 is detached to be cleaned when clogging takes place. The second filter element 81 prevents foreign matters from breaking into an engine when the first filter element 80 is detached for cleaning.

FIG. 16 shows a perspective view of a serial type air cleaner 90 disclosed in the document 2. As shown in FIG. 16, between a first facing sheet 91 and a second facing sheet 92, there is arranged a grooved sheet 93 that has mountain portions 94 and valley portions 95 alternately formed thereon. The valley portions 95 and mountain portions 94 form upper grooves and lower grooves, and the downstream end of upper groove rooms 96 is closed by a second end bead 99, while the upstream end of lower groove rooms 97 is closed by a first end bead 98. The central grooved sheet 93 is a filter member.

Unfiltered fluid inflows to upper groove rooms 96 that have their upstream end opened, as shown by black arrows, and is blocked by the second end bead 99. Accordingly, the fluid inflows to the lower groove rooms 97 through the grooved sheet 93, as shown by white arrows, when the unfiltered fluid is filtered. Thus filtered fluid outflows from the downstream end since the upstream end of the lower groove rooms 97 is closed.

However, there is raised the following problem in the configuration disclosed in the document 1.

That is, since both end surfaces of the cylindrical filter elements on the longitudinal direction are closed, the air comes to pass from the outer circumference side to the inner circumference side of the elements, which makes it difficult to sufficiently secure the air-passing area. As a result, pressure loss at the time of taking in air is prone to be large, and there may be raised performance deterioration when used for an engine to take in air. Furthermore, clogging frequently takes place in the elements, which raised a problem that the element cleaning interval is shortened.

On the other hand, as for the configuration disclosed in the document 2, since the direction of air flow accords with the axis direction of elements (direction along the groove rooms 97), the configuration is not appropriate when used for a construction machine that works at dusty places, in which case it is desired that air be taken from the upper side of a machine and be discharged horizontally.

SUMMARY OF THE INVENTION

It is therefore an object of the present invention to overcome the above-mentioned drawbacks by providing air cleaner that can reduce restriction at the time of taking in air and improve engine performance, and can prolong the element cleaning interval and improve maintainability, and is appropriate for a machine that is used at dusty places.

According to the present invention, there is provided an air cleaner, including: a casing; and a filter element arranged in the casing, wherein the filter element has mountain portions and valley portions formed continuously and alternately, the mountain portions and valley portions having predetermined height, at a first end of the filter element, at least the end of the mountain portions is closed, at a second end of the filter element, the end of the valley portions is closed, and air to be filtered by the filter element inflows to the filter element from at least the top side of the mountain portions, and filtered air outflows from at least the end of the mountain portions at the other end.

In the present invention, it is desired that the filter element is in the form of a cylinder having a hollow portion, the casing has arranged thereon an air inlet pipe for making air to be filtered inflow along a direction substantially perpendicular to the axis line direction of the filter element, and an air outlet pipe for making filtered air outflow along the axis line direction, the casing has formed therein a supporting portion for clingingly supporting the end outer circumference of the filter element on the closed valley portions side along the circumference direction continuously, and another supporting portion for clingingly supporting the end inner circumference of the filter element on the closed mountain portions side along the circumference direction continuously to close the hollow portion, and air to be filtered by the filter element inflows to the filter element from the top side of the mountain portions as well as from the end of the valley portions on the first end side, and filtered air outflows from the end of the mountain portions on the second end side as well as from the inner circumference of the hollow portion.

In the present invention, it is desired that the filter element is in the form of a cylinder having a hollow portion, the casing has arranged thereon an air inlet pipe for making air to be filtered inflow along a direction substantially perpendicular to the axis line direction of the filter element, and an air outlet pipe for making filtered air outflow along the axis line direction, the casing has formed therein a supporting portion for clingingly supporting the end outer circumference of the filter element on the closed valley portions side along the circumference direction continuously, and another supporting portion for supporting the end outer circumference of the filter element on the closed mountain portions side along the circumference direction intermittently, the filter element has formed therein a central closer for closing the end opening of the hollow portion on the closed mountain portions side, and air to be filtered by the filter element inflows to the filter element from the top side of the mountain portions as well as from the end of the valley portions on the first end side, and filtered air outflows from the end of the mountain portions on the second end side as well as from the inner circumference of the hollow portion.

In the present invention, it is desired that, at the downstream of the filter element, there is arranged a safety filter for preventing the break-in of foreign matters when the filter element is detached.

According to the present invention, since air inflowing from the top side of the mountain portions of the filter element can outflow also from at least one end of the filter element, path area (filtering area) can be increased, which can provide an air cleaner of small path resistance. According to the present invention, there may be employed a case in which filtered air is made to outflow from only one end (refer to sixth embodiment shown in FIG. 12K to FIG. 12N). In this case, since the direction of entire air inflowing from the top side is surely changed in the filter element to make filtered air outflow, the air cleaner can be made compact in configuration in case of taking in air from upward and sending out filtered air in the horizontal direction, and is desirably used for machines working at dusty places.

Furthermore, according to the present invention, air is made to inflow from the top side of the mountain portions of the cylindrical filter element as well as from the end of one end side thereof, and filtered air is made to outflow from the end of the other end side as well as from the inner circumference of the hollow portion. Thus, path area for filtered air can be made significantly large, which can provide an air cleaner of further smaller restriction.

Especially, according to the present invention, since one end side of the filter element is supported by the hollow portion, the flow of air to the one end side can be made smooth, and the capacity of the bottom of the casing can be made large and dust and so on can be accumulated sufficiently, and a discharge port for discharging dust and so on can be arranged at a desirable position.

Furthermore, according to the present invention, since there is formed a safety filter, when changing the filter element, foreign matters can be prevented from breaking thereinto. According to the present invention, in case of arranging the safety filter, the safety filter is not arranged in the hollow portion of the filter element, which can enlarge the thickness of the filter element and can increase path area.

BRIEF DESCRIPTION OF THE DRAWINGS

FIG. 4A shows a front view of an expanded part of the filter, FIG. 4B shows a side view of the expanded filter, FIG. 4C shows a side view thereof when viewed from the different direction;

FIG. 10D shows a front view, FIG. 10E shows a left side view of FIG. 10D, FIG. 10F shows a right side view of FIG. 10D;

FIG. 11G to FIG. 11J show views for explaining the filter of a fifth embodiment according to the present invention, and FIG. 11G shows a front view, FIG. 11H shows a left side view of FIG. 11G, FIG. 11J shows a right side view of FIG. 11G;

FIG. 12K to FIG. 12N show views for explaining the filter of a sixth embodiment according to the present invention, and FIG. 12K shows a front view, FIG. 12M shows a left side view of FIG. 12K, FIG. 12N shows a right side view of FIG. 12K;

DETAILED DESCRIPTION OF PREFERRED EMBODIMENTS

First Embodiment

Figure 1:
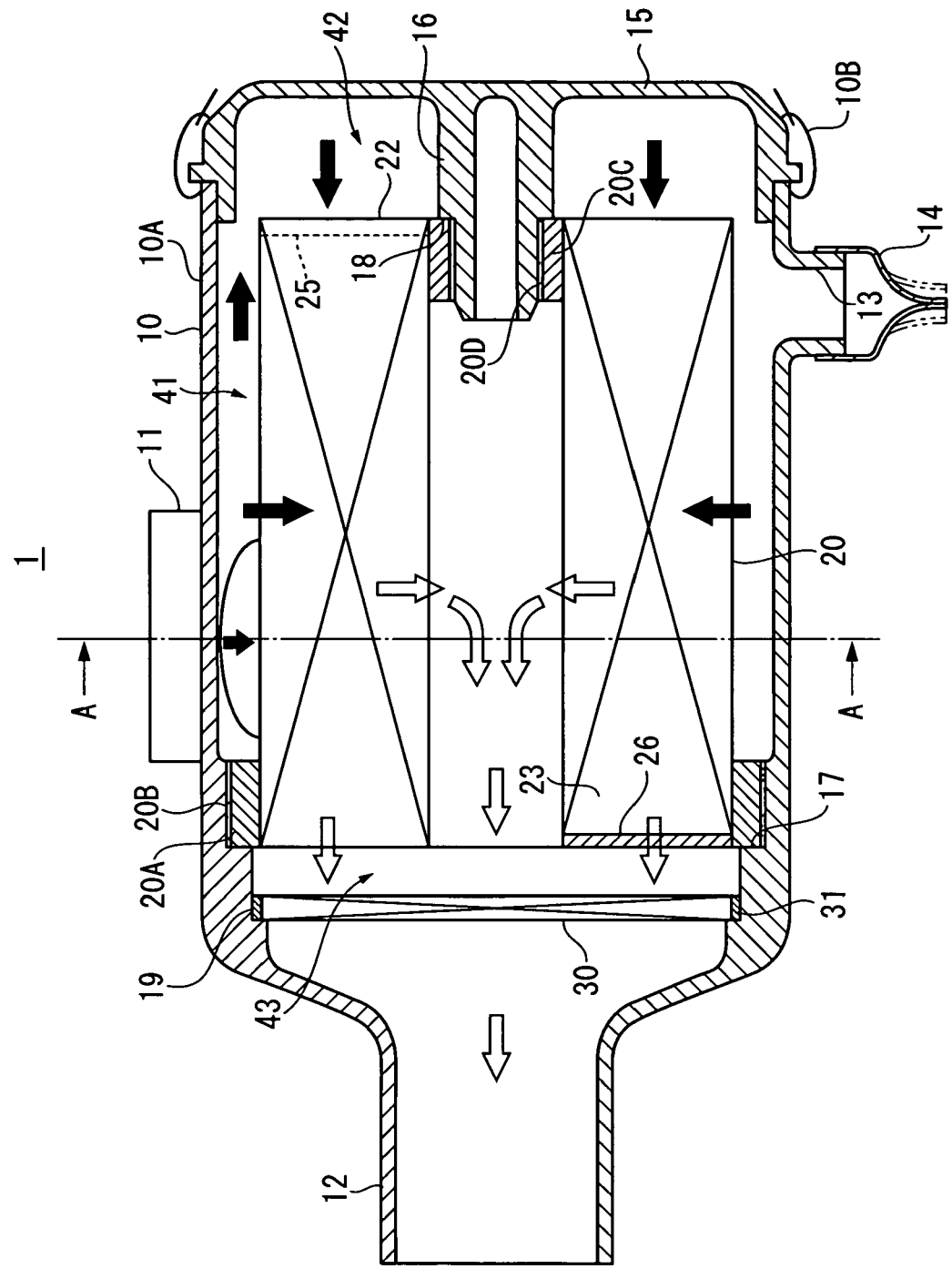
FIG. 1 shows a cross-sectional view of an air cleaner of a first embodiment according to the present invention.

A first embodiment of the present invention will further be described below with reference to the accompanying drawings. As for the second to seventh embodiments, parts or components similar to those of the first embodiment are indicated with the same reference numerals, and detailed explanation of which will be abridged or omitted.

Figure 2:
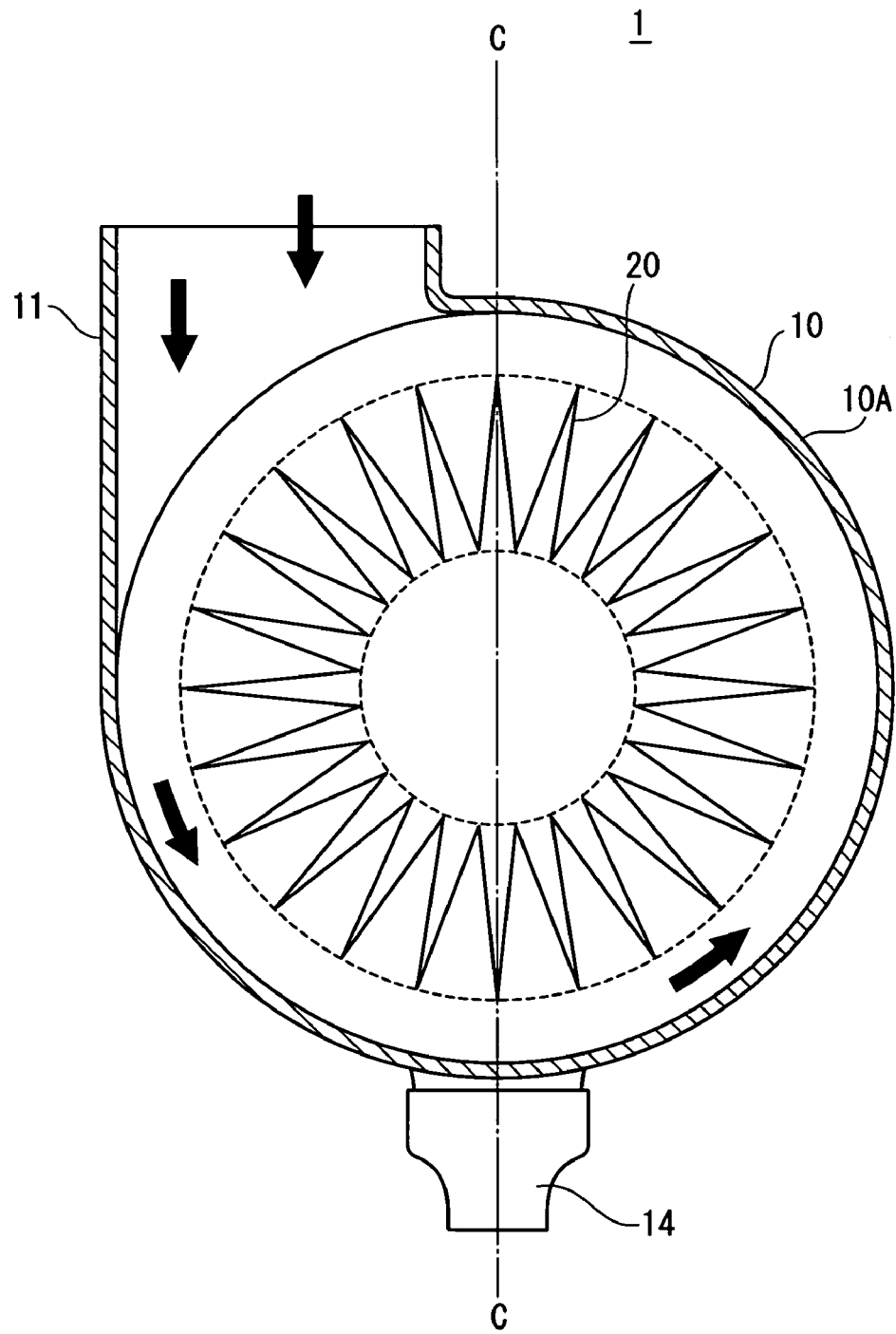
FIG. 2 shows an A-A line diagram viewed along arrows in FIG. 1.

FIG. 1 shows a cross-sectional view of an air cleaner 1 of the first embodiment. FIG. 2 shows an A-A line diagram viewed along arrows in FIG. 1.

The air cleaner 1 shown in FIG. 1 and FIG. 2 is placed on a construction machine that is used at dusty construction places, and includes a cylindrical casing 10 having a casing body 10A whose one end is opened, a filter element 20 arranged inside the casing 10, and a safety filter 30 arranged at the downstream side of the filter element 20 inside the casing 10.

At the outer circumference of the casing 10, there is formed an air inlet pipe 11 that is located eccentrically against a center C-C line shown in FIG. 2 and on the opposite side of the opening, which configuration leads ambient air to the inside of the casing 10 from upward along the center C-C line. At the other end of the casing 10, there is formed an air outlet pipe 12 through which air filtered by the filter element 20 outflows.

Furthermore, at the outer circumference of the casing 10, on the lower side or on the opposite side of the air inlet pipe 11, there is formed a discharge port 13 that discharges dust and so on accumulated inside the casing 10, and a valve 14 working as an opening and closing valve is attached to the discharge port 13. Since air including dust etc. comes in from the air inlet pipe 11, whirling around the outer circumference of the filter element 20, dust or the like is accumulated at one side of the bottom of the casing 10.

The valve 14 is made of flexible material such as rubber. When an engine is being driven, since the inner pressure of the casing 10 is negative, the valve 14 is elastically deformed to close the discharge port 13 (the state shown by solid lines in FIG. 1), while when the engine is suspended, the valve 14 is restored from the deformed state to open the discharge port 13 (the state shown by chain double-dashed lines in FIG. 1), dropping down or discharging accumulated dust and the like downward.

A cover 15 is detachably attached to the casing 10 using clamps 10B arranged at the casing body 10A side. At the inner center of the cover 15, there is formed a protrusion 16 that protrudes to the inside of the casing body 10A. When the cover 15 is attached to the casing body 10A, the protrusion 16 is inserted into a hollow portion of the filter element 20.

On the other hand, at the outer circumference of one end of the filter element 20 located on the air outlet side, there is fixed an outer circumference retention member 20A made of elastic material such as rubber continuously along the circumference direction using adhesion bond or the like. The outer circumference retention member 20A is made to abut on a supporting portion 17 in the shape of a step that is formed at the inner circumference of the casing 10, which configuration determines the position of the air outlet side of the filter element 20. Furthermore, at the further outer circumference of the outer circumference retention member 20A, there is formed a sealing portion 20B made of flexible elastic material such as elastomer foam material. When the sealing portion 20B clingingly comes into contact with the inner circumference of the larger diameter side of the supporting portion 17, filtered air is prevented from leaking from the positioning portion.

In the hollow portion of the filter element 20, at the inner circumference of one end thereof located on the opposite side of the air outlet side, there is fixed an inner circumference retention member 20C made of similar elastic material continuously along the circumference direction. At the further inner circumference of the inner circumference retention member 20C, there is formed a sealing portion 20D that clingingly comes into contact with the outer circumference of the protrusion 16 of the cover 15. The inner circumference retention member 20C is made to abut on a supporting portion 18 formed at the protrusion 16, which configuration determines the position of the entire filter element 20 within the casing 10 together with the abutment on the air outlet side.

In the state in which the filter element 20 is arranged within the casing 10, there is formed a first inflow space 41 communicating along the circumference direction between the outer circumference of the filter element 20 and the inner circumference of the casing 10, and there is formed a second inflow space 42 communicating with the first inflow space 41 between one end of the filter element 20 and the cover 15, and there is formed an outflow space 43 directly on the downstream side of one end of the filter element 20 on the air outlet side.

That is, as shown by black arrows in FIG. 1, the filter element 20 used in the present embodiment can take in air located at the first inflow space 41 from the outer circumference thereof as well as air located at the second inflow space 42 from one end thereof located on the cover 15 side. Furthermore, as shown by white arrows in FIG. 1, the filter element 20 can make thus taken in and filtered air outflow to the outflow space 43 from the inner circumference thereof as well as from one end thereof located on the air outlet side.

Next, referring to FIG. 3 and FIG. 6, the filter element 20 in the present embodiment will be explained.

Figure 3:
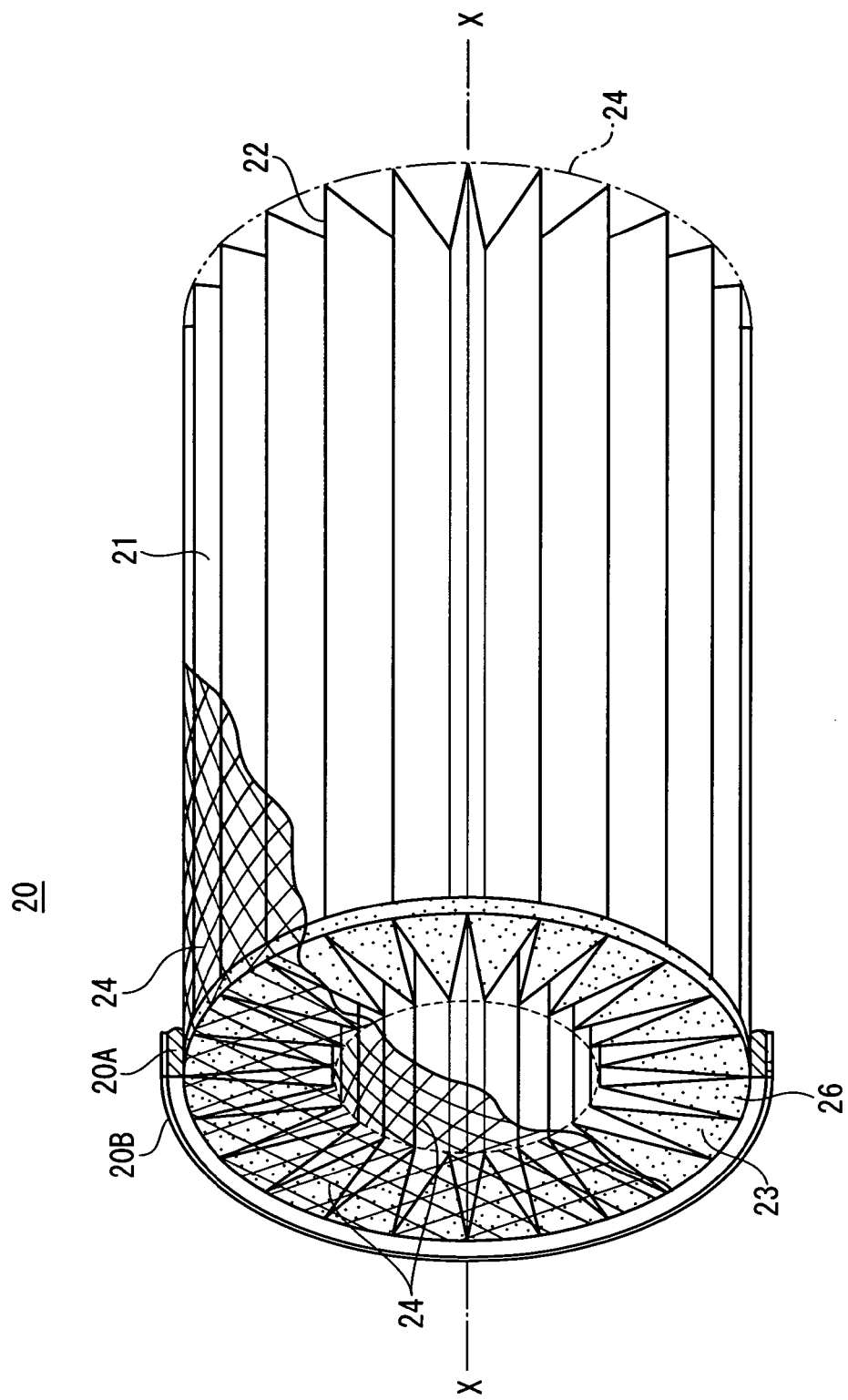
FIG. 3 shows an entire perspective view of a filter element used in the air cleaner of the first embodiment.
Figure 4A:
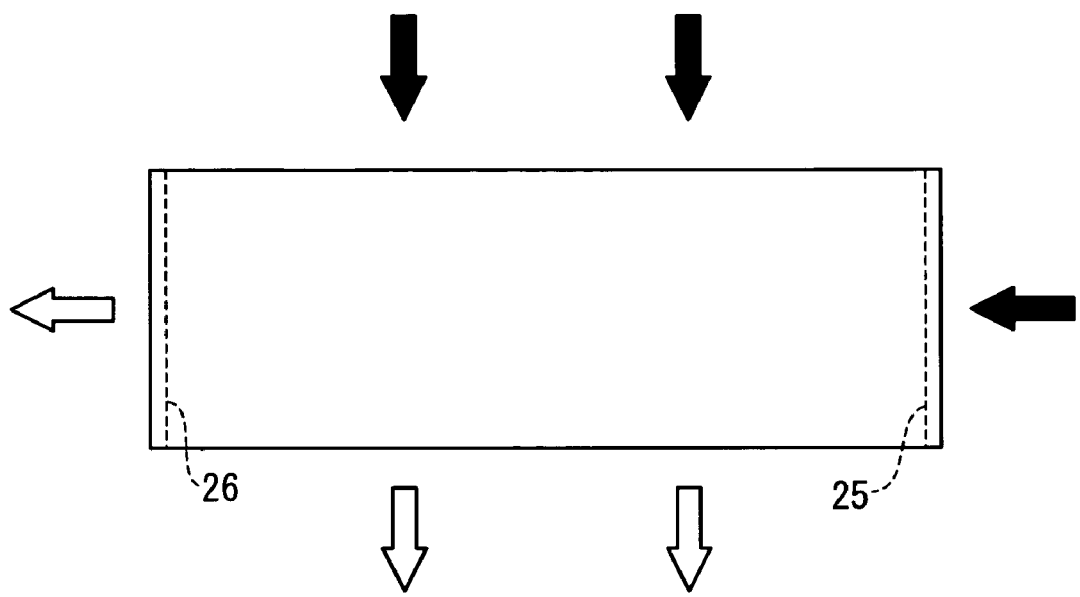
FIG. 4A to FIG. 4C show views for explaining a filter of the filter element.
Figure 4B:
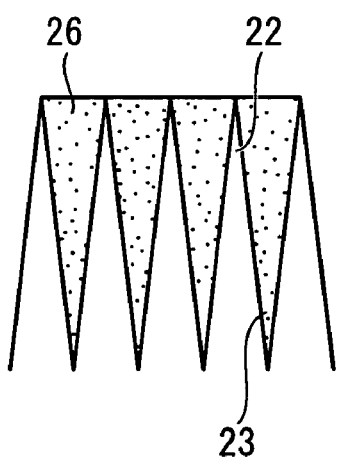
Figure 4C:
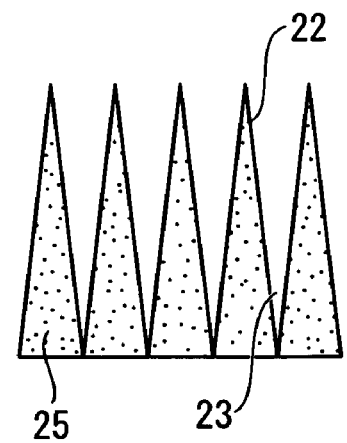
Figure 5:
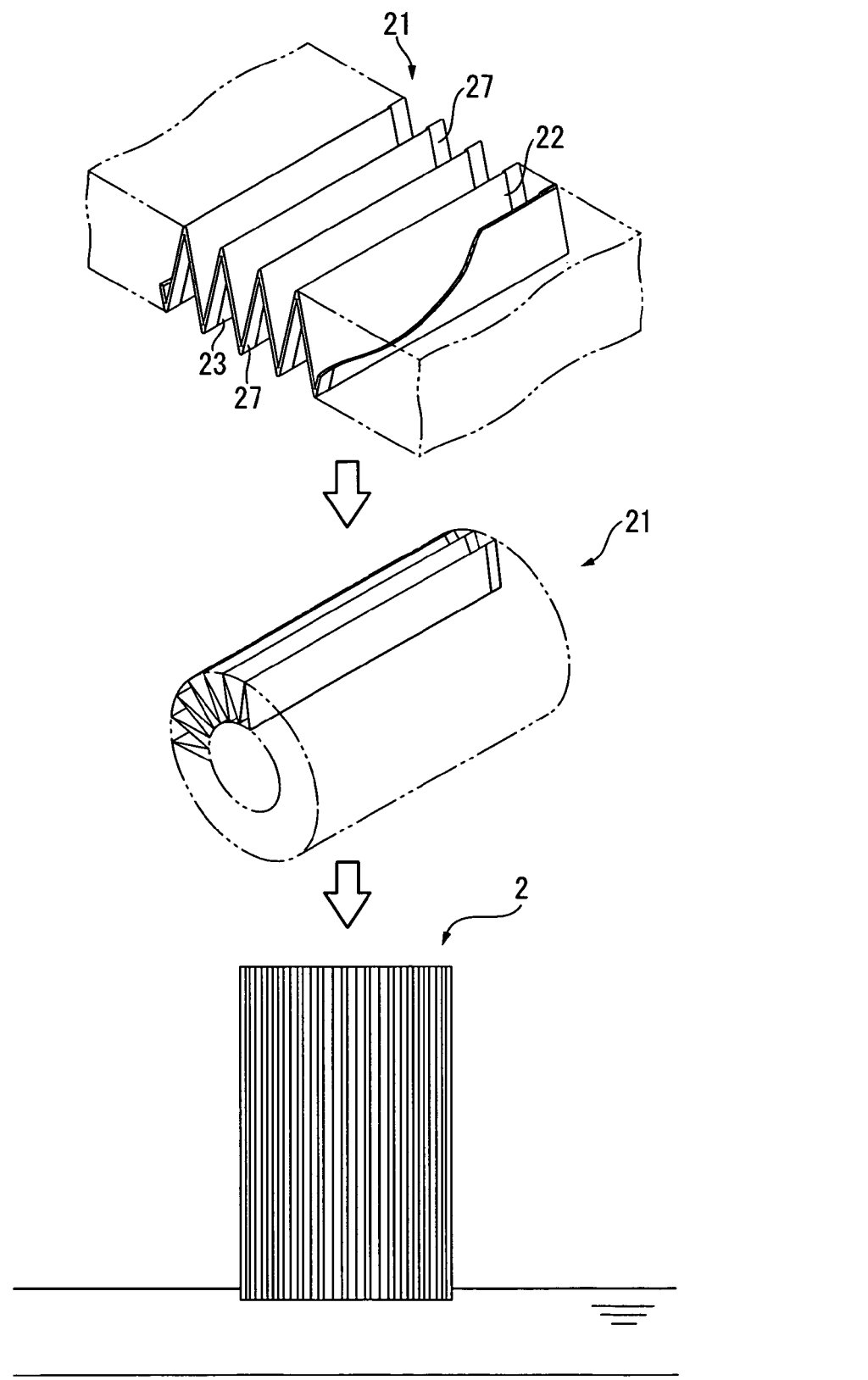
FIG. 5 is a view for explaining a method of forming the filter element.
Figure 6:
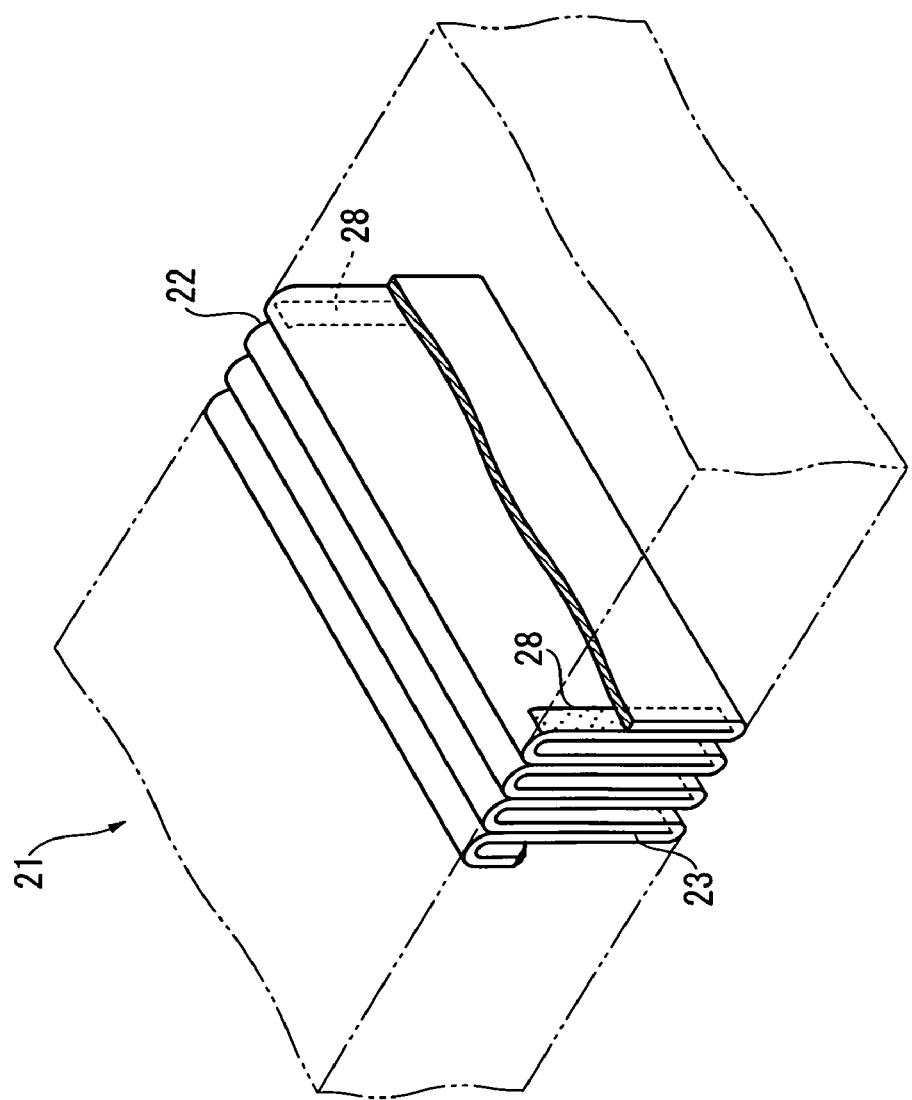
FIG. 6 is a view for explaining another method of forming the filter element.

FIG. 3 shows an entire perspective view of the filter element 20, FIG. 4A shows a front view of an expanded part of a filter 21 of the filter element 20, FIG. 4B shows a side view of the expanded filter 21 when viewed from the air outlet pipe 12 (FIG. 1) side, FIG. 4C shows a side view thereof when viewed from the cover 15 (FIG. 1) side, FIG. 5 and FIG. 6 are views for explaining one method of forming the filter element 20.

As shown in FIG. 3, FIG. 4A to FIG. 4C, the filter element 20 is in the form of a cylinder having multiple pleats that spread radially in the cross-section, which is formed by pleating the filter 21 made of a filter paper or non-woven fabric, forming mountain portions 22 and valley portions 23 alternately, and then rounding the pleated filter 21 around an axis line X-X. The outer circumference, inner circumference, and both ends on the axis line X-X of the cylindrical filter 21 are covered and protected by a bored member 24 such as a punching metal, an expanded metal, etc. Above-described outer circumference retention member 20A and inner circumference retention member 20C (FIG. 1) are fixed to the surface of the bored member 24.

In the filter element 20, one end of the mountain portions 22 on the axis line X-X located on the cover 15 side is closed by a mountain closer 25 made of such as urethane foam material of comparatively soft rubber state, while on the opposite side, one end of the valley portions 23 located on the air outlet pipe 12 side is closed by a valley closer 26 made of the same material.

Air is filtered when passing through the filter 21. In case of explaining the filtering in the state in which the filter 21 is expanded, as shown by black arrows in FIG. 4A, air inflows from the top side of the mountain portions 22 as well as from one opened end side of the valley portions 23 along the axis line X-X direction to pass through the filter 21 to be filtered. Then, as shown by white arrows, thus filtered air outflows from the bottom side of the mountain portions 22 as well as from one opened end side of the mountain portions 22 along the axis line X-X direction.

In case of explaining the filtering in the state in which the filter 21 is in the form of a cylinder, as shown in FIG. 1, air located in the first inflow space 41 and second inflow space 42 inflows from the mountain portions 22 protruding around the outer circumference of the filter element 20 (valley portions 23 opened around the outer circumference) as well as from one end side of the valley portions 23 opened to the cover 15 side, and outflows to the outflow space 43 from the bottom side of the mountain portions 22 through the hollow portion as well as from one end side of the mountain portions 22 opened to the outlet pipe 12 side to pass through the safety filter 30 to reach the air outlet pipe 12.

The method of forming the respective mountain closer 25 and valley closer 26 for the mountain portions 22 and valley portions 23 is not restricted, and a method shown in FIG. 5 may be employed.

That is, firstly, the filter 21 in the form of a band is prepared. Then, a tape 27 of a predetermined width is stuck to one edge along the longitudinal direction of the front side of the filter 21, while the similar tape 27 is stuck to the other edge of the back side thereof. The sticking intensity of the tape 27 is not required to be large, and may be of the extent under which the tape 27 does not fall off at the time of pleating process. Then, when the filter 21 is pleated, at one end along the width direction, the edge of the valley portions 23 is masked by the tape 27, while at the other end, the edge of the mountain portions 22 is masked by the tape 27.

Then, the filter 21 is rounded, forming a cylinder, and is dipped into molten urethane material (dipping) one side by one side. The filter 21 is dipped by a depth less than the width of the tape 27. After the dipping, when urethane material attached to the filter 21 is sufficiently cured, the tapes 27 stuck to the mountain portions 22 and valley portions 23 are peeled off. In this way, at one end, the valley closer 26 is formed only at the valley portions 23, while at the other end, the mountain closer 25 is formed only at the mountain portions 22. It is desirable that the tape 27 has water-shedding quality. The reason is that the tapes 27 can be easily peeled off since urethane material does not attach to the tape 27.

Furthermore, as a method to close one end of the mountain portions 22 and valley portions 23 without forming the mountain closer 25 and valley closer 26, there is employed an adhesion method.

That is, adhesion bond is applied to part of the band-shaped filter 21 to which the tape 27 is stuck, and then the filter 21 is pleated to bond surfaces where the adhesion bond is applied. Accordingly, even though closed sides are different from the case using the tape 27, as a result, as shown in FIG. 6, at one end of the filter 21, the mountain portions 22 alone are closed by adhesion bond 28, while at the other end, the valley portions 23 alone are closed by adhesion bond 28. The filter 21 is rounded to form a cylinder to obtain the filter element 20.

The safety filter 30 used in the present embodiment is arranged within the outflow space 43 so as to prevent foreign matters from breaking into the air outlet pipe 12 at the time of changing the filter element 20, and is held at a stage portion 19 with its outer circumference clingingly coming into contact with the inner circumference of the casing 10 through a retention member 31 made of elastic material located on the outer circumference thereof, as shown in FIG. 1.

Second Embodiment

Figure 7:
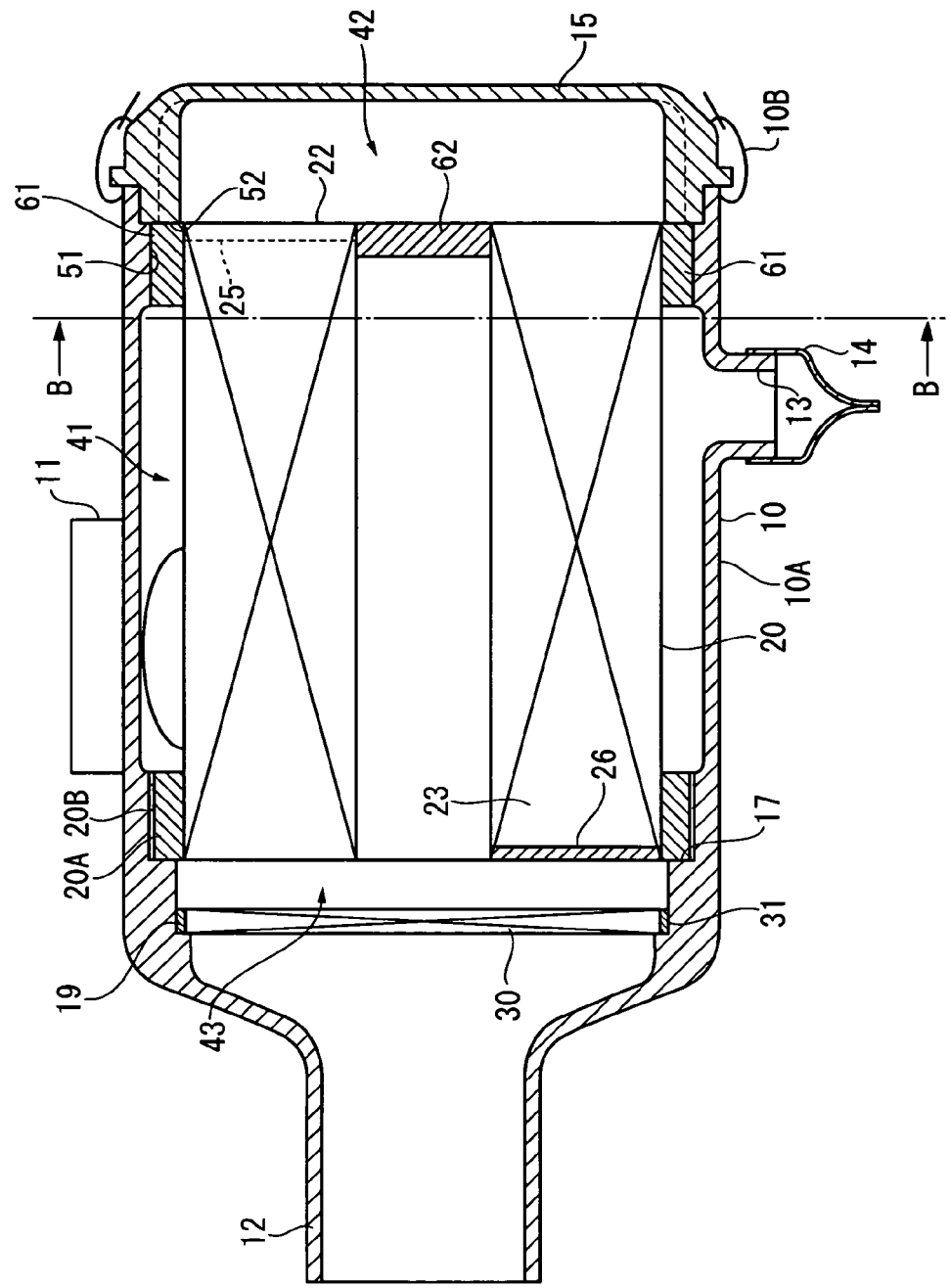
FIG. 7 shows a cross-sectional view of an air cleaner of a second embodiment according to the present invention.
Figure 8:
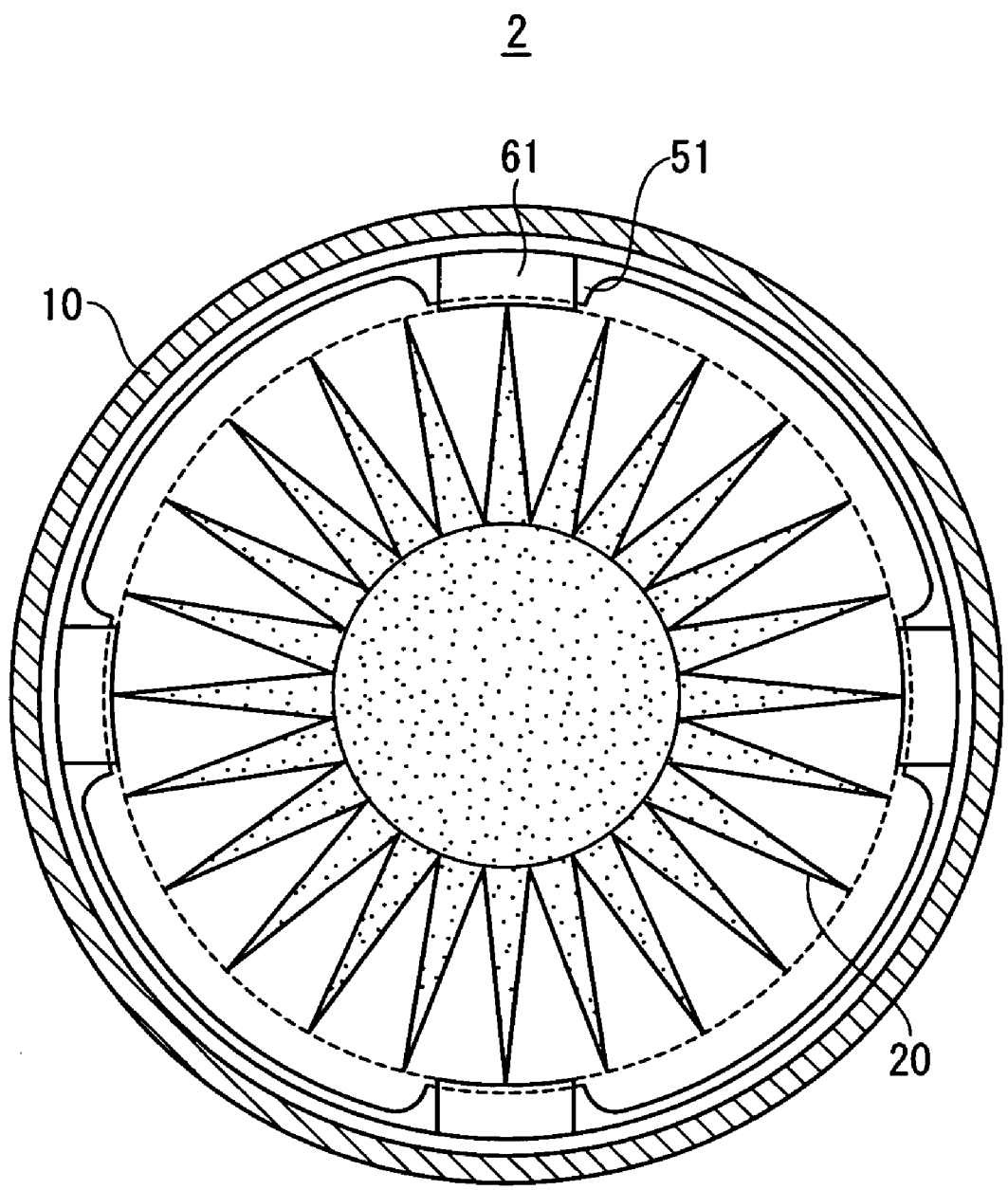
FIG. 8 shows a B-B line diagram viewed along arrows in FIG. 7.

FIG. 7 shows a cross-sectional view of an air cleaner 2 of a second embodiment according to the present invention. FIG. 8 shows a B-B line diagram viewed along arrows in FIG. 7.

In the air cleaner 2 shown in FIG. 7 and FIG. 8, at the inner circumference of one end of the casing body 10A located on the cover 15 side, there is formed a supporting portion 51 for supporting the outer circumference of the filter element 20. At the outer circumference of the filter element 20, there is fixed an outer circumference retention member 61. When the filter element 20 is housed in the casing 10, the outer circumference retention member 61 is made to abut on the supporting portion 51, and one end of the filter element 20 is retained. At one end of the cover 15 located on the casing body 10A side, there is formed an abutting portion 52. When the cover 15 is mounted to the casing body 10A, the abutting portion 52 is made to abut on the side of the outer circumference retention member 61 to determine the position of the filter element 20 along the axis direction.

The outer circumference retention member 61 of the filter element 20 and the abutting portion 52 of the cover 15 are formed at four positions with equal space provided therebetween, and the first inflow space 41 and the second inflow space 42 communicate with each other through gap which is formed by providing the space, which easily makes filtered air inflow into the second inflow space 42, and makes it possible to make air inflow from the end of the valley portions 23 of the filter element 20 to the inside thereof along the axis direction. So as to prevent air including dust from breaking into the hollow portion of the filter element 20, there is formed a central closer 62 at the end of the hollow portion. The flow of air in the filter element 20 is similar to that in the first embodiment, and detailed explanation will be omitted.

Third Embodiment

Figure 9:
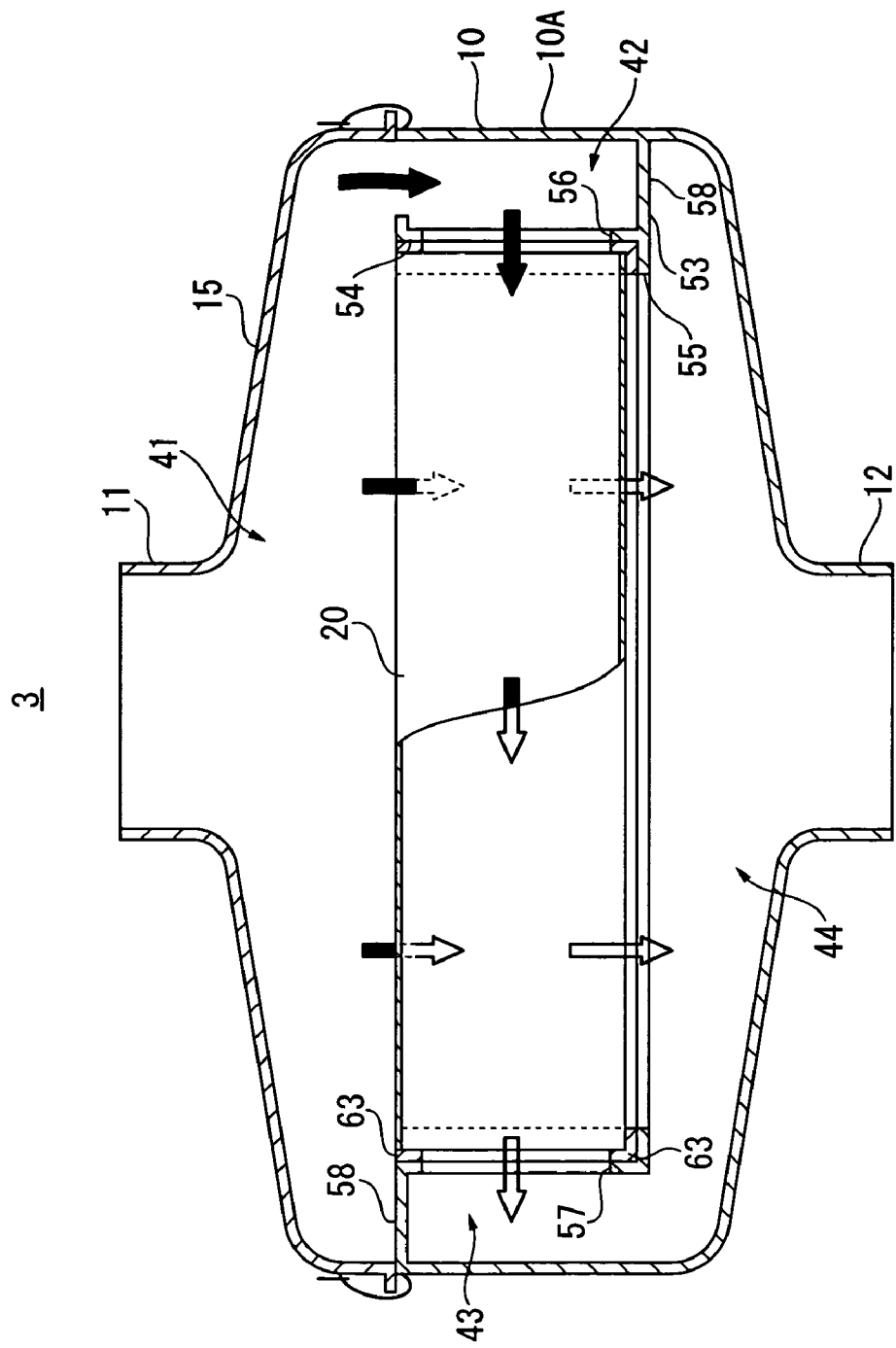
FIG. 9 shows a cross-sectional view of an air cleaner of a third embodiment according to the present invention.

In an air cleaner 3 in a third embodiment shown in FIG. 9, the shape of the casing 10 and the filter element 20 is different from that in the first and second embodiments.

That is, the casing body 10A of the casing 10 in the third embodiment is substantially in the shape of a box whose upper portion is opened, and the air outlet pipe 12 is formed at the lower portion of the casing 10. There is formed the air inlet pipe 11 at the cover 15 that closes the opened portion of the casing body 10A.

In the casing 10, there is arranged a housing 53 in which a filter element 20 in the form of a rectangular solid is housed. In the housing 53, there is formed an upper opening 54 through which the filter element 20 is mounted from upward, a lower opening 55 to make filtered air outflow downward, an inlet opening 56 that faces opened end of the valley portions 23 of the filter element 20, and an outlet opening 57 that faces opened end of the mountain portions 22.

There is formed the first inflow space 41 directly above the filter element 20 which is formed by the cover 15, and there is formed the second inflow space 42 at the direct upstream of the opened end of the valley portions 23 (inlet opening 56), and there is formed the outflow space 43 at the direct downstream of the opened end of the mountain portions 22 (outlet opening 57), and there is formed a large outflow space 44 directly under the filter element 20. The first inflow space 41 and the second inflow space 42 directly communicate with each other, and the outflow spaces 43, 44 directly communicate with each other. In other words, the inflow spaces 41, 42 and the outflow spaces 43, 44 communicate with each other through the filter element 20, and a shielding section 58 is formed between the outer circumference of the housing 53 and the inner circumference of the casing body 10A so that the air does not directly flow from the inflow spaces 41, 42 to the outflow spaces 43, 44.

In the filter element 20, the filter 21 that has been described in the first embodiment using FIG. 4A to FIG. 4C is used. Accordingly, air coming from the air inlet pipe 11 to the first inflow space 41 and second inflow space 42 inflows from the top side of the mountain portions 22 as well as from the opened end of the valley portions 23, as shown by black arrows in FIG. 9, and outflows from the bottom side of the mountain portions 22 to the downward outflow space 44 as well as from the opened end of the mountain portions 22 to the outflow space 43, as shown by white arrows, outflowing to large outflow space. Air coming to the outflow space 43 outflows to the outflow space 44 to reach the air outlet pipe 12.

The outer surface of the filter 21 of thus configured filter element 20 is also protected by a bored member (not shown), and at the lower circumference and upper circumference of the bored member, there are arranged retention members 63 made of elastic material continuously along the four-side circumference. When the retention members 63 clingingly come into contact with the inner surface of the housing 53, filtered air can be prevented from leaking, and the filter element 20 can be housed without looseness, thereby there is no possibility that the filter element 20 goes off upward under shaking raised in general use. In the third embodiment, there is arranged no safety filter. On the other hand, there may be arranged a safety filter at a desired position in the outflow space 44.

Fourth Embodiment

Figure 10D:
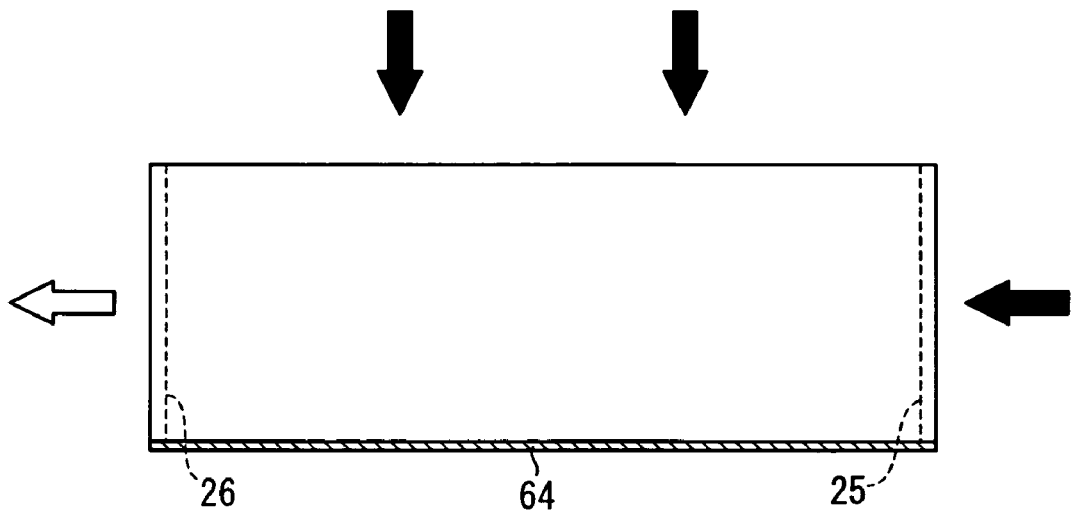
FIG. 10D to FIG. 10F show views for explaining the filter of a fourth embodiment according to the present invention.
Figure 10E:
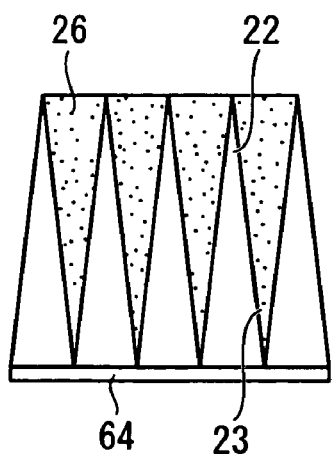
Figure 10F:
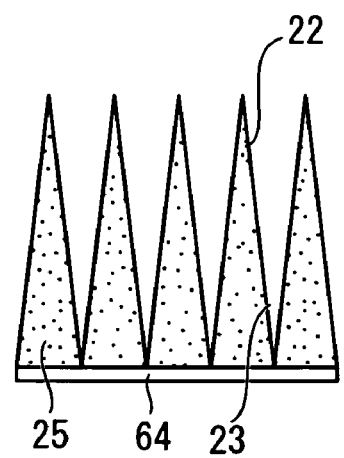

FIG. 10D to FIG. 10F show views for explaining the filter 21 of a fourth embodiment according to the present invention. FIG. 10D shows a front view of the filter 21, FIG. 10E shows a left side view of FIG. 10D, FIG. 10F shows a right side view of FIG. 10D.

As shown in the drawings, the lower surface of the filter 21 or the bottom surface of the mountain portions 22 is entirely closed by a bottom closer 64 in the form of a sheet. Fluid to be filtered inflows from the top side of the mountain portions 22 as well as from the opened end (right side surface) of the valley portions 23, as shown by black arrows, and filtered fluid outflows from the opened end (left side surface) of the mountain portions 22, as shown by a white arrow.

When rounded around the axis line to form a cylinder, the filter 21 can be employed in the filter element 20 of the first and second embodiments, while when not rounded, the filter 21 can be employed in the filter element 20 of the third embodiment. The following fifth and sixth embodiments are similar cases.

Fifth Embodiment

Figure 11G:
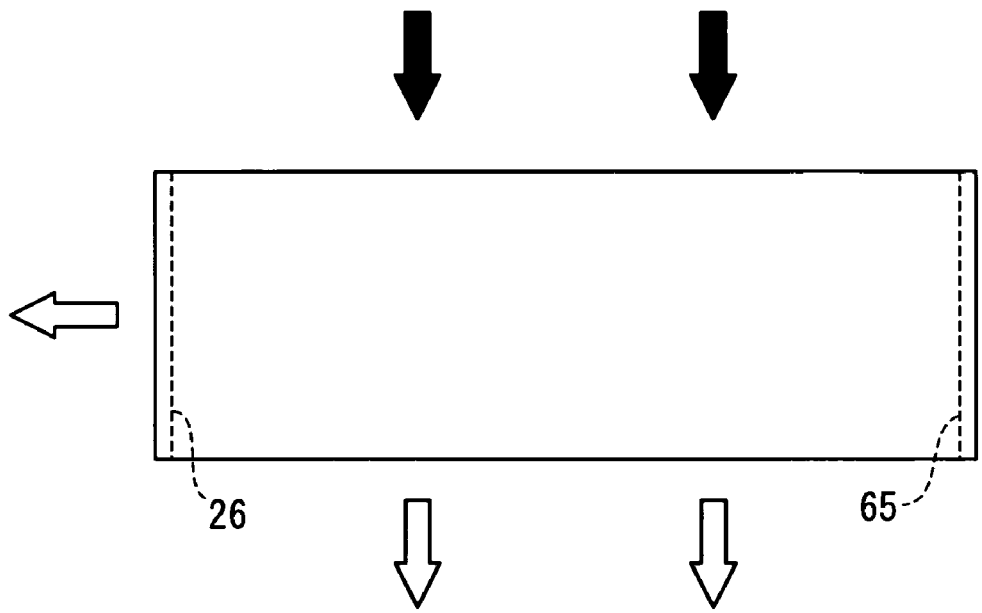
Figure 11H:
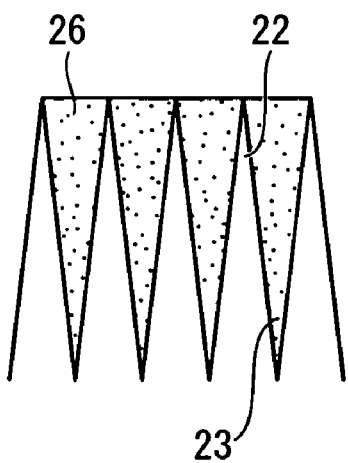
Figure 11J:
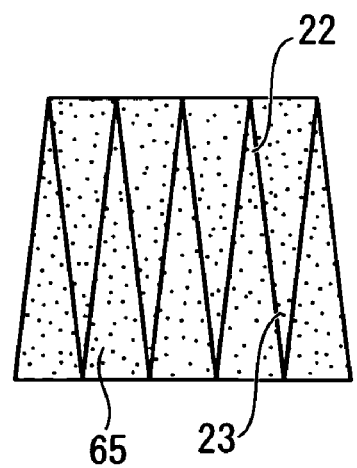

FIG. 11G to FIG. 11J show views for explaining the filter 21 of a fifth embodiment according to the present invention. FIG. 11G shows a front view of the filter 21, FIG. 11H shows a left side view of FIG. 11G, FIG. 11J shows a right side view of FIG. 11G.

As shown in the drawings, the right surface of the filter 21 is entirely closed by a side closer 65. Fluid to be filtered inflows from the top side of the mountain portions 22, as shown by black arrows, and filtered fluid outflows from the bottom of the mountain portions 22 as well as from the opened end (left side surface) of the mountain portions 22, as shown by white arrows.

Sixth Embodiment

Figure 12K:
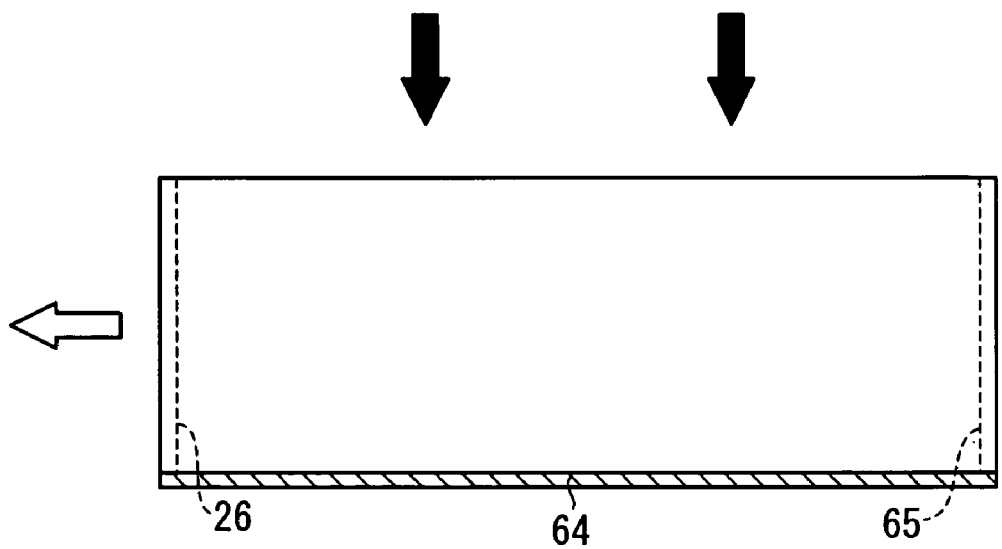
Figure 12M:
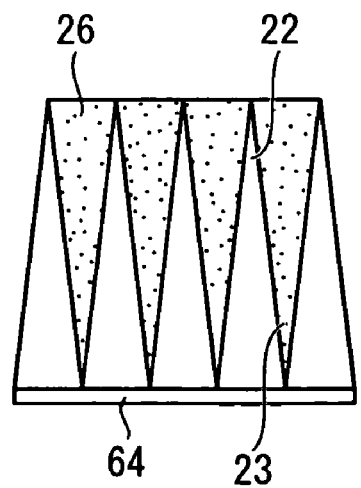
Figure 12N:
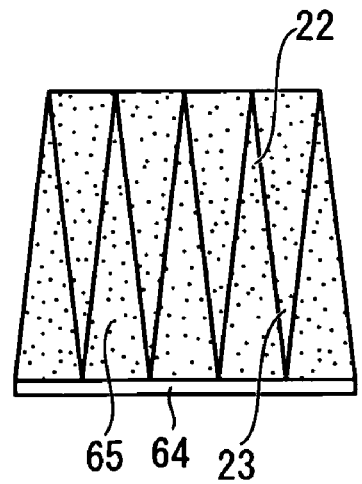

FIG. 12K to FIG. 12N show views for explaining the filter 21 of a sixth embodiment according to the present invention. FIG. 12K shows a front view of the filter 21, FIG. 12M shows a left side view of FIG. 12K, FIG. 12N shows a right side view of FIG. 12K.

As shown in the drawings, the lower surface of the filter 21 or the bottom surface of the mountain portions 22 is entirely closed by the bottom closer 64 and the right surface of the filter 21 is entirely closed by the side closer 65. Fluid to be filtered inflows from the top side of the mountain portions 22, as shown by black arrows, and filtered fluid outflows only from the opened end (left side surface) of the mountain portions 22, as shown by a white arrow.

Seventh Embodiment

Figure 13:
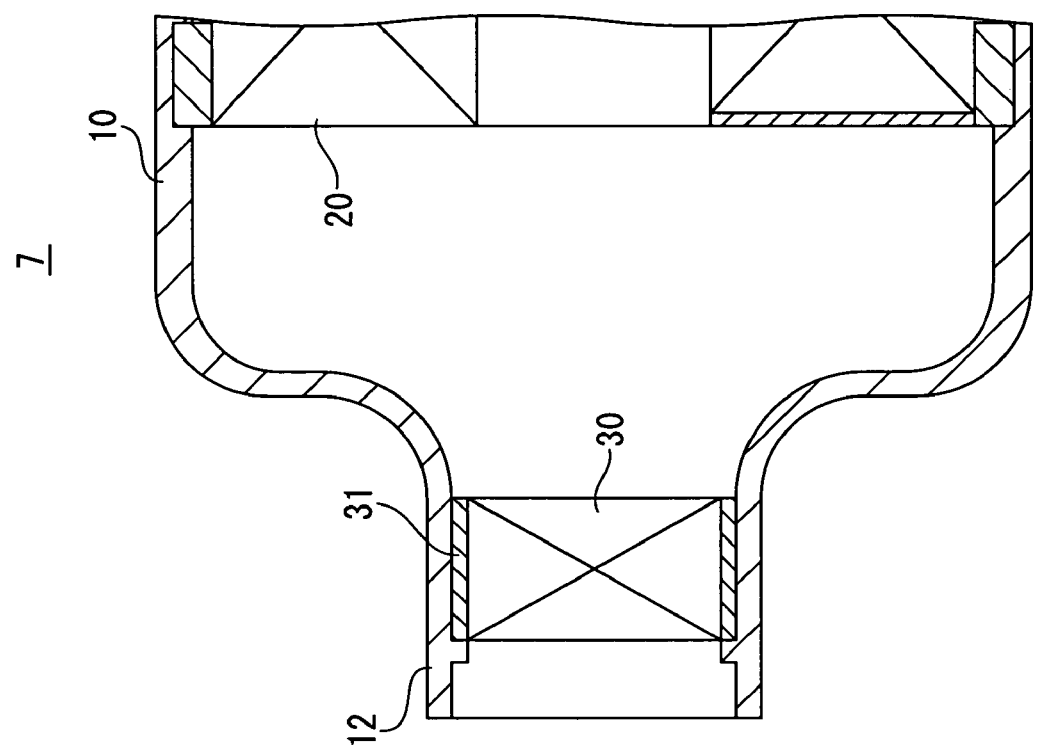
FIG. 13 shows a cross-sectional view of the principal part of an air cleaner of a seventh embodiment according to the present invention.
Figure 14:
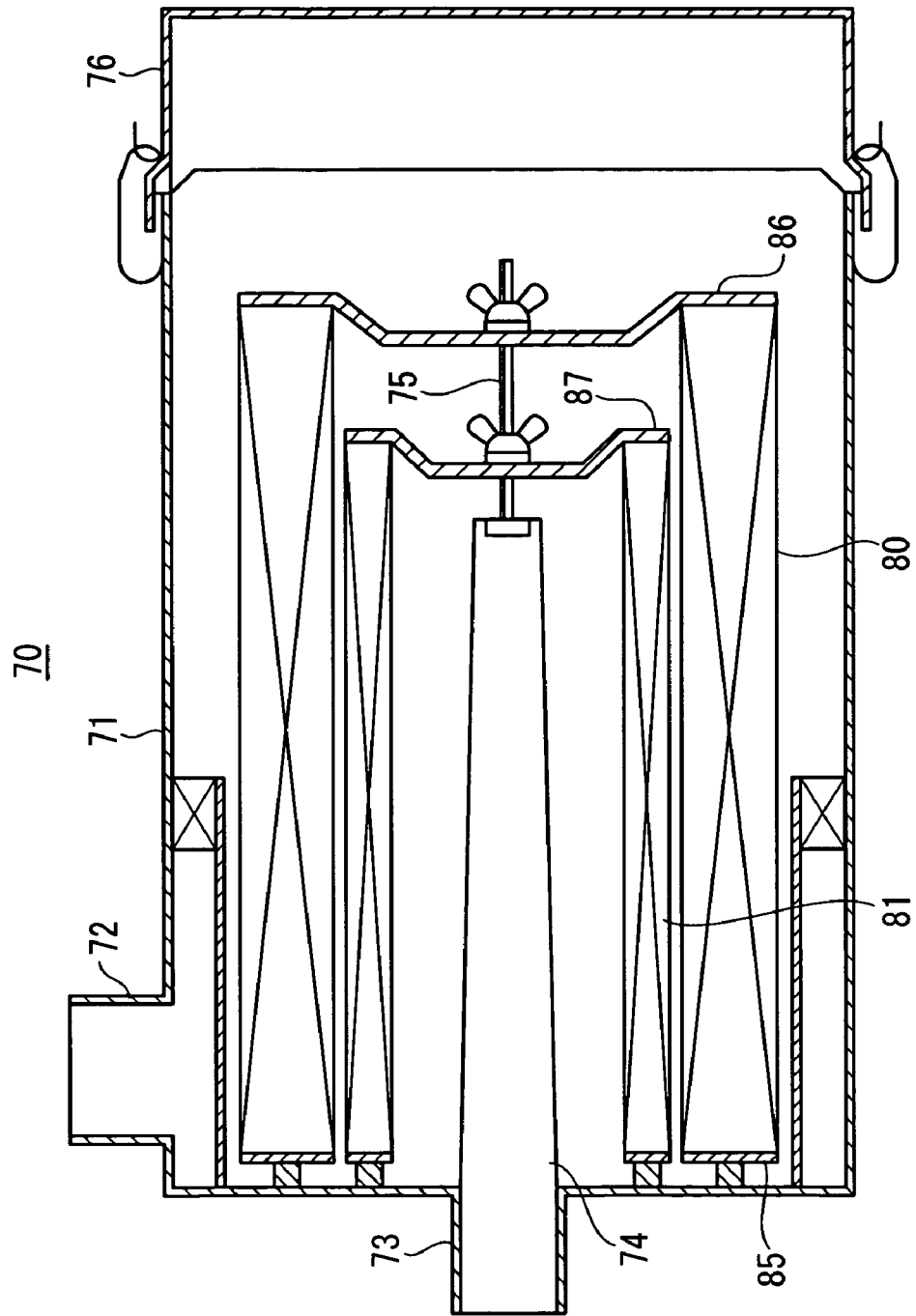
FIG. 14 shows a cross-sectional view of a double-cylinder type air cleaner which is the first example of a conventional air cleaner.
Figure 15:
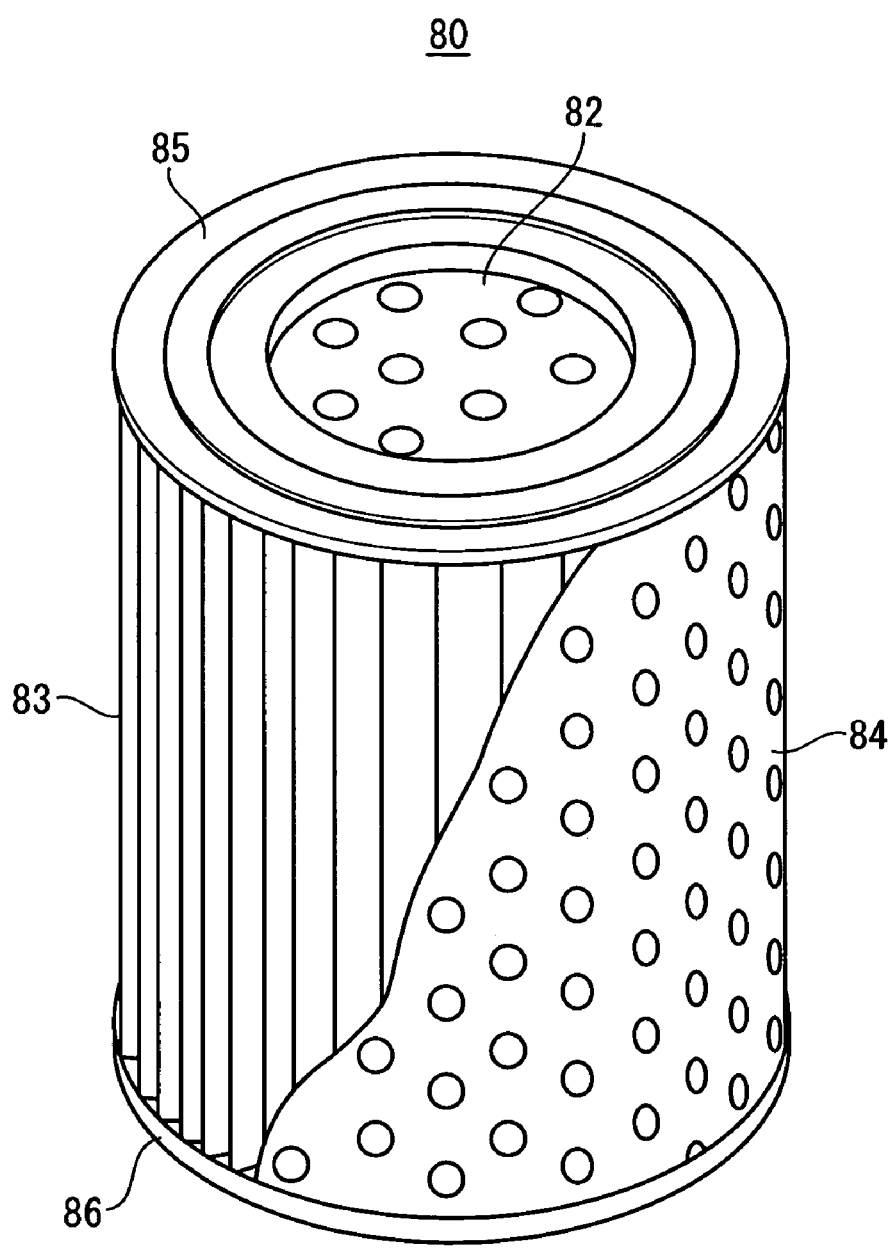
FIG. 15 shows a perspective view of a first filter element of the double-cylinder type air cleaner.
Figure 16:
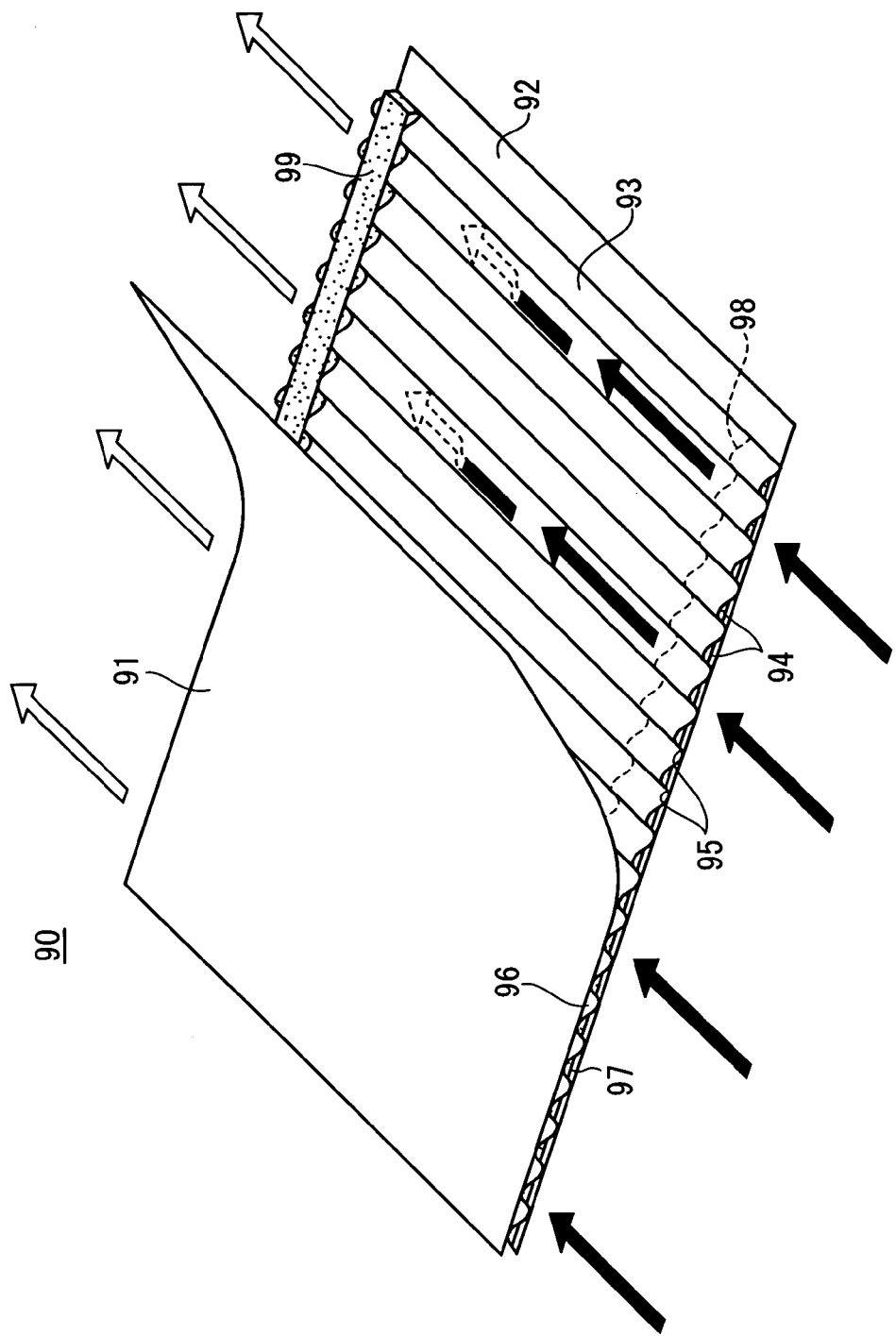
FIG. 16 shows a perspective view of a serial type air cleaner which is the second example of a conventional air cleaner.

FIG. 13 shows a cross-sectional view of the principal part of an air cleaner 7 of a seventh embodiment according to the present invention.

The seventh embodiment is different from the first and second embodiments in the point that safety filter 30 is arranged within the air outlet pipe 12. Being arranged within the air outlet pipe 12 whose diameter is smaller than that of the casing 10, the safety filter 30 has its entire thickness (dimension along the axis line) largely set up to increase filtering area.

While the invention has been described in accordance with certain preferred embodiments thereof illustrated in the accompanying drawings and described in the above description in detail, it should be understood by those ordinarily skilled in the art that the present invention is not limited to the embodiments, but various modifications, alternative constructions or equivalents can be implemented without departing from the scope and spirit of the present invention.

The description that restricts above-disclosed shape and number is examples intended for easy understanding of the present invention, and does not restrict the present invention. Accordingly, description using name of parts excluding part or all of the restriction of shape and number is included in the present invention.

The priority application Numbers JP2004-184503 and JP2005-164557 upon which this patent application is based are hereby incorporated by reference.

What is claimed is:

1. An air cleaner comprising:

a casing; and a filter element arranged in the casing;

wherein:

the filter element has mountain portions and valley portions formed continuously and alternately, the mountain portions and valley portions having a predetermined height, at a first end of the filter element, at least an end of the mountain portions is closed, at a second end of the filter element, an end of the valley portions is closed, the filter element is in a form of a cylinder having a hollow portion, the casing has arranged thereon an air inlet pipe which causes air to be filtered to inflow in a direction substantially perpendicular to an axis line direction of the filter element, and an air outlet pipe which causes filtered air to outflow in the axis line direction, the casing has a first supporting portion that clingingly supports an outer circumference of the second end of the filter element in a circumferential direction continuously, and a second supporting portion that clingingly supports an inner circumference of the first end of the filter element in the circumferential direction continuously to close the hollow portion, the first supporting portion being provided on an inner circumference of the casing and the second supporting portion being provided on a protrusion from an inner wall of the casing, and air to be filtered by the filter element inflows to the filter element from a top side of the mountain portions as well as from an end of the valley portions on a first end side of the filter element, and filtered air outflows from an end of the mountain portions on a second end side of the filter element as well as from an inner circumference of the hollow portion.

2. An air cleaner, comprising:

a casing; and a filter element arranged in the casing;

wherein:

the filter element has mountain portions and valley portions formed continuously and alternately, the mountain portions and valley portions having a predetermined height, at a first end of the filter element, at least an end of the mountain portions is closed, at a second end of the filter element, an end of the valley portions is closed, the filter element is in a form of a cylinder having a hollow portion, the casing has arranged thereon an air inlet pipe which causes air to be filtered to inflow in a direction substantially perpendicular to an axis line direction of the filter element, and an air outlet pipe which causes filtered air to outflow in the axis line direction, the casing has a first supporting portion that clingingly supports an outer circumference of the second end of the filter element in a circumferential direction continuously, and a second supporting portion that supports an outer circumference of the first end of the filter element in a circumferential direction intermittently, the first and second supporting portions being provided on an inner circumference of the casing, and the filter element has formed therein a central closer for closing an end opening of the hollow portion on a first end side of the filter element, and air to be filtered by the filter element inflows to the filter element from a top side of the mountain portions as well as from an end of the valley portions on a first end side of the filter element, and filtered air outflows from an end of the mountain portions on a second end side of the filter element as well as from an inner circumference of the hollow portion.

3. The air cleaner according to claim 1, further comprising a safety filter which prevents a break-in of foreign material when the filter element is detached, wherein the safety filter is arranged downstream of the filter element.

4. The air cleaner according to claim 2, further comprising a safety filter which prevents a break-in of foreign material when the filter element is detached, wherein the safety filter is arranged downstream of the filter element.

5. The air cleaner according to claim 1, wherein the air inlet pipe extends in a direction substantially perpendicular to an axis line of the mountain portions of the filter element so as to be in communication with spaces in the valley portions, the casing and the first end of the filter element define an inflow space, the inflow space being entirely covered by the casing so that the spaces in the valley portions are in communication with each other, and the air cleaner is arranged to cause the air to be filtered to flow into the filter element at least in the direction perpendicular to the axis line of the mountain portions of the filter element and to cause filtered air to flow in the direction of the axis line of the mountain portions of the filter element through the inflow space.

6. The air cleaner according to claim 2, wherein:

the air inlet pipe extends in a direction substantially perpendicular to an axis line of the mountain portions of the filter element so as to be in communication with spaces in the valley portions, the casing and the first end of the filter element define an inflow space, the inflow space being entirely covered by the casing so that the spaces in the valley portions are in communication with each other, and the air cleaner is arranged to cause the air to be filtered to flow into the filter element at least in the direction perpendicular to the axis line of the mountain portions of the filter element and to cause filtered air to flow in the direction of the axis line of the mountain portions of the filter element through the inflow space.

7. The air cleaner according to claim 1, wherein the filter element includes an outer circumference retaining member which is clingingly supported by the first supporting portion.

8. The air cleaner according to claim 7, wherein the outer circumference retaining member includes a sealing portion which is made of flexible elastic material and which contacts the first supporting portion.

9. The air cleaner according to claim 1, wherein the filter element includes an inner circumference retaining member which is clingingly supported by the second supporting portion.

10. The air cleaner according to claim 9, wherein the inner circumference retaining member includes a sealing portion which is made of flexible elastic material and which contacts the second supporting portion.

11. The air cleaner according to claim 2, wherein the filter element includes an outer circumference retaining member which is clingingly supported by the first supporting portion.

12. The air cleaner according to claim 11, wherein the outer circumference retaining member includes a sealing portion which is made of flexible elastic material and which contacts the first supporting portion.

13. The air cleaner according to claim 2, wherein the filter element includes an outer circumference retaining member which is clingingly supported by the second supporting portion.

* * * * *